United States Patent [19]

Yoshida et al.

[11] Patent Number: 5,262,363

[45] Date of Patent: Nov. 16, 1993

[54] OVERGLAZE COLORS FOR POTTERY

[75] Inventors: Shuji Yoshida, Sasebo; Yasuyuki Tsutsumi, Saga; Satoru Noudomi, Kishima; Junichi Kawaguchi, Arita, all of Japan

[73] Assignee: Saga Prefecture, Saga, Japan

[21] Appl. No.: 12,803

[22] Filed: Feb. 2, 1993

Related U.S. Application Data

[63] Continuation-in-part of Ser. No. 727,035, Jul. 8, 1991, abandoned, which is a continuation-in-part of Ser. No. 536,842, Jun. 12, 1990, abandoned.

[30] Foreign Application Priority Data

Jun. 19, 1989 [JP] Japan .................................. 1-157571
Jul. 19, 1989 [JP] Japan .................................. 1-187172

[51] Int. Cl.$^5$ .................. C03C 8/14; C03C 3/091; C03C 3/095; C03C 3/097
[52] U.S. Cl. ......................................... 501/17; 501/63; 501/64; 501/66; 501/67
[58] Field of Search ..................... 501/17, 64, 63, 66, 501/32

[56] References Cited

U.S. PATENT DOCUMENTS

| | | | |
|---|---|---|---|
| 4,361,654 | 11/1982 | Ohmura et al. | 501/21 |
| 4,446,241 | 5/1984 | Francel et al. | 501/78 X |
| 4,537,862 | 8/1985 | Francel et al. | 501/14 |
| 4,806,334 | 2/1989 | Fujinaka et al. | 501/21 X |
| 4,814,298 | 3/1989 | Nelson et al. | 501/18 X |

Primary Examiner—Karl Group
Assistant Examiner—David R. Sample
Attorney, Agent, or Firm—Armstrong, Westerman, Hattori, McLeland & Naughton

[57] ABSTRACT

An overglaze color for pottery. Pigment is added to a colorless frit which has the composition (wt %):

(1) silicon dioxide 30 to 70
(2) alumina 0.1 to 15
(3) boron oxide 20 to 40
(4) alkali metal oxide 2 to 17
(5) one or more oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide 0.1 to 15 and having a thermal expansion coefficient of $5.0 \times 10^{-6}/°C$. to $7.0 \times 10^{-6}/°C$. at 50° to 350° C. and a thermal softeningpVperature of 500° to 640° C. The overglaze color according to the invention causes no cracking, increases the color developing property of the pigment and has high chemical durability.

2 Claims, No Drawings

OVERGLAZE COLORS FOR POTTERY

This application is a continuation-in-part of application Ser. No. 07/727,035, filed Jul. 8, 1991, which in turn is a continuation-in-part of application Ser. No. 07/536,842, filed Jun. 12, 1990, abandoned.

BACKGROUND OF THE INVENTION

The present invention relates to an overglaze color for pottery, and in particular to an overglaze color for pottery not containing harmful substances such as lead, cadmium, etc.

In the normal procedure for manufacturing pottery, a raw material is processed to unglazed pottery at 600°–1000° C. and underglaze decoration is then drawn with pigments such as cobalt, manganese, etc. Then, glaze (frit) is coated on the decoration and the pottery is fired at about 1300° C. Thereafter, the overglaze colors (frit) containing pigments are applied as a coating, and the pottery is fired again at about 800° C. This firing temperature is very important for the maintenance of the melting property of the overglaze frit, for the prevention of devitrification and cracking as well as for effective color development of pigments.

Basic conditions of overglaze colors for pottery are: (1) at the firing temperature of about 800° C. where the colors and the pigments develop color to the utmost extent, the thermal expansion coefficient must not differ from that of the glaze fired at a high temperature of 1300° C.; (2) the frit component must have no devitrification property and must develop color together with pigment when the latter is added.

To prepare the conventional type overglaze colors for pottery, alkali metal oxide and boron oxide are added to silicon oxide and alumina derived from silica rock, kaolin, etc. in order to improve the melting property, and zirconium oxide and zinc oxide are added to increase chemical durability. To the frit thus prepared, pigment is added. Because acid resistance is reduced when alkali metal oxides are used in a large quantity, lead oxide with a high melting property and good affinity with pigment is used as an essential component.

Further, cadmium oxide is added to increase the color developing property of the pigment. Thus, the conventional type overglaze colors for pottery contain heavy metals such as lead, cadmium, etc. in amounts as high as 70 wt % in some cases. Therefore, heavy metals such as lead, cadmium, etc. are eluted when pottery is used, and it is pointed out that such components cause harmful effects when the pottery is used as tableware such as dishes.

To solve the problems, various attempts and studies have been made to reduce the elution of heavy metals such as lead, cadmium, etc. and to increase acid resistance by improving firing conditions. For example, an attempt has been made to increase the resistance to acid by adding a trace quantity of zirconium oxide to the lead silicate type frit (Journal of Japanese Ceramic Industry Association; 83 (2), 81; (1975)). Or, a special kiln for underglaze decoration is used, or a special charging procedure into the kiln is invented. Further, attempts have been made to equalize the intra-kiln temperature, or to increase temperature gradually within the temperature range of about 400°–500° C., to maintain the temperature at more than 760° C. for 30–60 minutes, or to promote degassing in the kiln.

However, because the conventional type overglaze colors basically contain lead and cadmium in their chemical composition, it is impossible to eliminate the elution through the addition of an acid-resistant component or through the improvement of firing conditions.

In the safety standards for food additives in accordance with the provisions of the Food Hygiene Law, Article 10 Paragraph 1, it is provided that the elution quantity after immersion in 4% acetic acid aqueous solution for 24 hours must be less than 20 ppm for pottery to be used for liquid, less than 7 ppm for pottery not to be used for liquid, and 2.0 ppm for a container to keep food. In conventional type overglaze colors for pottery, harmful metal exceeding the safety standard values is often eluted even with a slight change in firing conditions.

An object of this invention is to provide overglaze colors for pottery, which contain no harmful metal components such as lead, cadmium, etc. but which have the same properties as conventional lead-containing overglaze colors for pottery, while maintaining an acid resistance property. It is also to provide a method for manufacturing such overglaze colors.

SUMMARY OF THE INVENTION

Overglaze colors for pottery must have a lower thermal softening temperature and melting temperature for obtaining a better color developing property of pigments, must have the same thermal expansion coefficient as that of the pottery to avoid cracking and must have a high acid-resistant property, an alkali-resistant property and high hardness.

To meet the above requirements, in the overglaze colors for pottery according to the present invention pigment is added to a frit having the following composition (wt %):

(1) silicon dioxide 30 to 70
(2) alumina 0.1 to 15
(3) boron oxide 20 to 40
(4) alkali metal oxide 2 to 17
(5) one or more oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide 0.1 to 15, and
(6) one of the oxides selected from 0 to 25 wt % of alkaline earth metal oxide, 0 to 15 wt. % of zirconium oxide or zinc oxide, or 0 to 20 wt % of bismuth oxide.

A preferred composition of the frit according to the present invention consists of the following composition in wt %:

silicon dioxide 45.0 to 55,
alumina 0.1 to 6,
boron oxide 20 to 40,
alkali metal oxide 2 to 17,
an oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, and dysprosium oxide 0.1 to 5.0,
alkali earth metal oxide 0 to 25,
zirconium oxide 0 to 15,
zinc oxide 0 to 15.

With the composition of the frit according to the present invention, chemical durability can be increased because silicon dioxide and alumina are contained in the frit. Also, by increasing the content of boron oxide, it is possible to decrease the melting point while minimizing the thermal expansion coefficient and to improve the color developing property of the pigment. Also, by adding the oxides selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide, it is possible to prevent a decrease of the acid-resistant property and hardness by the increase of boron oxide and to improve the chemical durability.

The frit according to the present invention is colorless and has a thermal expansion coefficient ($1/°$ C.; linear expansion coefficient; the same applies hereinafter) of $5.0 \times 10^{-6}/°$ C. to $7.0 \times 10^{-6}/°$ C. at 50° to 350° C. and a thermal softening temperature of 500° to 640° C. After pigment is added to convert it to the overglaze colors for pottery, it is fired at 700° to 900° C. No visible external change occurs when it is immersed in 4% acetic acid aqueous solution or 3% caustic soda aqueous solution for one day respectively. Without lead and cadmium, which the conventional overglaze colors contain, the overglaze colors with good color developing property, comparable to the conventional lead-containing overglaze colors for pottery, can be obtained.

The overglaze colors for pottery according to the present invention have a thermal softening temperature as low as 500° to 640° C. and have no substantial difference in thermal expansion coefficient from that of pottery or glaze, and cracking and the like can be avoided.

Namely, thermal expansion coefficient of the overglaze colors for pottery by this invention is $5.0 \times 10^{-6}$ to $7.0 \times 10^{-6}$ (50°-350° C.), and this is not inferior to the conventional lead-containing colors having a thermal expansion coefficient of $5.0 \times 10^{-6}$ to $16 \times 10^{-6}$ (50°-350° C.). Also, the firing temperature range can be adjusted to 700°-900° C. where pigment provides good color development, and the same result as that of the lead-containing frit can be obtained.

The overglaze color for pottery according to the present invention contains one or more oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide, in an amount of 0.1 to 15 wt %, and it has Vickers hardness of 460 to 580 kg/mm$^2$ and high acid-resistant property. Further, the overglaze colors for pottery of this invention have such acid-resistant and alkali-resistant properties that, when the pottery is immersed for one day each in 4% acetic acid aqueous solution and 3% caustic soda aqueous solution, there is no change in external appearance, no cloud or blur, and lead and cadmium are not detected at all.

DESCRIPTION OF THE PREFERRED EMBODIMENTS

In the following, a detailed description is given of the components of the overglaze colors for pottery of this invention, First, silicon oxide and alumina of the frit of the overglaze colors for pottery of this invention are produced from natural silica rock (such as Indian silica rock or Hinooka silica rock) and New Zealand kaolin. Silica rock consists mostly of silicon oxide, and New Zealand kaolin consists of 51 wt % of silicon oxide and 36 wt % of alumina. The materials of other types may be used if they do not contain impurities.

Zinc oxide of reagent class in form of oxide may be used in the present invention. The boron oxide can be derived from boric acid, the alkaline earth metal oxide derived from carbonate, the zirconium oxide derived from zirconium silica and the alkali metal oxide derived from carbonate alkali if the oxides can be produced when the frit is formed by firing.

Next, a description is given of the purpose of blending, of raw material form and of the percentage of each of the components.

First, silicon oxide, which is a main component of the frit of overglaze colors for pottery of this invention, should be contained in an amount of 30–70 wt %, preferably 45.0 to 55 wt %, in the frit. If it is contained in an amount of less than 30 wt %, chemical durability is deteriorated. If it is contained in an amount of more than 70 wt %, melting temperature becomes too high.

Alumina is used as an ornamentation on the skeleton of silicon oxide when frit is formed. When alumina derived from kaolin is used, a better reactivity with silicon oxide can be obtained. It is preferable to add alumina in an amount of 0.1–15 wt %, more preferably from 0.1 to 6 wt %. If the percentage exceeds 15 wt %, alumina turns to crystals and the frit becomes devitrified. If the added quantity of alumina is less than 0.1 wt %, chemical durability cannot be increased.

Boron oxide is added for the purpose of decreasing the melting point of the frit. By adding it in an amount of 20 to 40 wt %, it is possible to decrease the melting point without increasing the thermal expansion coefficient. If it is less than 25 wt %, the effect of decreasing the melting temperature is reduced. If it exceeds 40 wt %, the thermal expansion coefficient becomes too high.

One or more types of alkali metal oxides are added in the form of alkali metal salts. It is preferable to use a salt which is converted to an oxide through firing, e.g., a carbonate alkali. The alkali metal oxide is added for the purpose of decreasing the melting point. It is added in an amount of 2–17 wt % to the total quantity of the entire frit. If it exceeds 17 wt %, there is no more acid resistance, and intrusion may occur.

The overglaze color for pottery according to the present invention is characterized in that it contains, in addition to the above components, one or more oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide. The commercially available forms of these oxides are used as reagents, and they are added to the frit in an amount of 0.1 to 15 wt %, preferably 0.1 to 5.0 wt % to the entire frit. If the content is less than 0.1 wt %, chemical stability, particularly the acid-resistant property, is decreased and crazing may occur or hardness is reduced. If it exceeds 15 wt %, melting temperature is increased, causing insufficient melting or devitrification.

The basic composition of the overglaze color for pottery of this invention is as described above, but it is preferable to add the following additives.

Namely, zirconium oxide can be added to give chemical stability, and its content is preferably 0–15 wt %.

Also, to add luster to overglaze colors for pottery, alkali earth metal oxide, e.g. barium oxide, calcium oxide, etc. may be added, and its content is preferably 0–25 wt %.

To give chemical stability, zinc oxide may be added, and its content is preferably 0-15 wt %.

Bismuth oxide may be added as an auxiliary component to decrease the melting point of the frit and to increase the property of developing green color in the overglaze colors. Its content is preferably 0 to 20 wt % to the entire frit. If the content exceeds 20 wt %, the acid-resistant property is decreased and the linear expansion coefficient is increased, inducing cracking.

As the pigment in the overglaze color for pottery of this invention, copper carbonate, ferric oxide, antimony trioxide, cobalt oxide, etc. can be used. By changing the content of copper carbonate, the color can be changed from blue to green. With ferric oxide and antimony trioxide, color can be developed from reddish to brownish. With cobalt oxide, color can be developed from blue to indigo.

Next, a description is given of the manufacturing process of overglaze colors for pottery of this invention.

First, natural materials such as silica rock, kaolin, etc. are blended with additives, and the mixture is pulverized to a fine powder of 60 mesh (250 μm) or less, and this is melted in a frit melting crucible at 1000°-1400° C., or more preferably, at 1250°-1350° C., for 0.5-2 hours and matured. Then, it is quenched by dropping into water, and it is further pulverized into fine particles of several μm in diameter. These particles are used as the frit of the overglaze colors for pottery. By mixing pigment in the frit, it is used as an overglaze color for pottery.

The overglaze color for pottery of this invention is used as a color for coating by dispersing in an organic solvent, e.g., glycerin. It is coated on the glaze layer formed on the unglazed pottery and is fired at 700°-900° C., or more preferably, at 800° C.

In the following description, the features of this invention will be described in connection with certain specific embodiments, but the present invention is not limited to these embodiments.

EMBODIMENT 1

As natural materials, Hinooka silica rock and New Zealand kaolin were used, and zirconium silicate (manufactured by Wako Pure Chemical Industry Co., Ltd.), boric acid (ibid.), barium carbonate (ibid.), calcium carbonate (ibid.), sodium carbonate (ibid.), potassium carbonate (ibid.), and lanthanum oxide (ibid.) were added in such a manner that the component ratio shown in Table 1 is obtained when fired. With 200 g in one batch, it was mixed in a plastic pot.

Next, the mixture was passed through a screen of 60 mesh and was placed in a frit melting crucible. After it was melted and matured at 1300° C. for one hour in a melting furnace having a 20 kW Siliconit heating element, the melted product was dropped into water for quenching. Then, it was pulverized into particles of 10-500 μm by a vibration mill. Further, it was wet-pulverized for 48 hours in a pot mill, and frit powder of several μm was prepared.

To 100 g of this frit, the following pigments were added to prepared different types of overglaze colors for pottery:

(1) 5 g of copper carbonate;
(2) 3 g of cobalt oxide;
(3) 10 g of ferric oxide and 2 g of antimony trioxide;
(4) 3 g of Degussa pigment (pigment No. 23419);
(5) 2 g of Degussa pigment (pigment No. 27404).

Each of the above overglaze colors was dispersed in water, coated on a glaze layer of pottery and was fired at 780° C.

As the result, (1) developed blue color, (2) light ultramarine, (3) reddish color, (4) yellow and (5) pink color. Table 1 summarizes the properties of the above overglaze colors for pottery including melting point (melting points show almost no change according to the types or the quantity of pigment used in the embodiments of this invention), thermal expansion coefficient after firing, firing temperature, the change after acid resistance and alkali resistance tests, etc.

EMBODIMENT 2

In the oxide composition of the Embodiment 1, calcium oxide was not added, and zinc oxide (Wako Pure Chemical Industry Co., Ltd.) was added instead. All other components were the same as in Table 1. Thus, the mixture was fired, and overglaze colors for pottery were prepared by the same procedure as in Embodiment 1.

As shown in Table 1, colors having the same properties as the overglaze colors of the Embodiment 1 were obtained. When the pigments as described in Embodiment 1 were added, the same color development as in Embodiment 1 was observed.

EMBODIMENT 3

The composition of Embodiment 2 was fired in such a manner that its oxide composition became the same as that of Table 1, and overglaze colors for pottery were prepared by the same procedure as in Embodiment 1.

As shown in Table 1, colors having the same properties as the overglaze colors of Embodiment 1 were obtained. When the pigments as described in Embodiment 1 were added, the same color development as in Embodiment 1 was observed.

EMBODIMENT 4

The composition of Embodiment 2 was fired in such a manner that its oxide composition became the same as that of Table 1, and overglaze colors for pottery were prepared by the same procedure as in Embodiment 1.

As shown in Table 1, colors having the same properties as the overglaze colors of Embodiment 1 were obtained. When the pigments as described in Embodiment 1 were added, the same color development as in Embodiment 1 was observed.

EMBODIMENT 5

In the oxide composition of Embodiment 2, zirconium oxide and barium oxide were not added, and lithium carbonate (Wako Pure Chemical Industry Co., Ltd.) was added instead. This was fired in such a manner that the oxide composition became the same as that of Table 1, and overglaze colors for pottery were prepared by the same procedure as in Embodiment 1.

As shown in Table 1, colors having the same properties as the overglaze colors of Embodiment 1 were obtained. When the pigments as described in Embodiment 1 were added, the same color development as in Embodiment 1 was observed.

EMBODIMENT 6

In the oxide composition in Embodiment 2, zinc oxide was not added, and strontium (Wako Pure Chemical Industry Co., Ltd.) was added instead. This was fired in such a manner that the oxide composition became the same as that of Table 1, and overglaze colors for pottery were prepared by the same procedure as in Embodiment 1.

As shown in Table 1, colors having the same properties as the overglaze colors of Embodiment 1 were obtained. When the pigments as described in Embodiment 1 were added, the same color development as in Embodiment 1 was observed.

EMBODIMENT 7

In the oxide composition in Embodiment 2, bismuth oxide (Wako Pure Chemical Industry Co., Ltd.) was added. This was fired in such a manner that the oxide composition became the same as that of Table 1, and overglaze colors for pottery were prepared by the same procedure as in Embodiment 1.

As shown in Table 1, colors having the same properties as the overglaze colors of Embodiment 1 were obtained. When the pigments as described in Embodiment 1 were added, the same color development as in Embodiment 1 was observed.

EMBODIMENT 8

The oxide in Embodiment 2 was fired to have the composition as shown in Table 1, and overglaze colors for pottery were prepared by the same manner as in Embodiment 1.

As shown in Table 1, overglaze colors having the same performance characteristics as those of Embodiment 1 were obtained. When the pigments of Embodiment 1 were added, color developed in the same manner as in Embodiment 1.

TABLE 1

| Oxide standard frit composition (wt %) | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| $SiO_2$ | 49.0 | 45.5 | 50.0 | 40.0 | 37.0 | 49.0 | 39.0 | 45.0 |
| $ZrO_2$ | 5.0 | 4.0 | 5.0 | 5.0 | — | 5.0 | 4.5 | 5.0 |
| $Al_2O_3$ | 2.0 | 1.5 | 2.0 | 3.0 | 6.0 | 2.0 | 2.5 | 3.0 |
| $La_2O_3$ | 2.0 | 5.0 | 5.0 | 2.0 | 5.0 | 2.0 | 2.0 | 2.0 |
| $B_2O_3$ | 24.0 | 22.0 | 21.0 | 29.0 | 38.0 | 24.0 | 22.5 | 26.0 |
| BaO | 5.0 | 5.0 | 4.5 | 7.0 | — | 5.0 | 4.5 | 5.0 |
| ZnO | — | 7.0 | 4.5 | 7.0 | 8.0 | — | 4.5 | 5.0 |
| CaO | 5.0 | — | — | — | — | — | — | — |
| SrO | — | — | — | — | — | 5.0 | — | — |
| $Na_2O$ | 2.0 | 4.0 | 3.0 | 2.0 | 2.0 | 2.0 | 2.5 | 3.0 |
| $K_2O$ | 6.0 | 6.0 | 5.0 | 5.0 | 2.0 | 6.0 | 5.0 | 6.0 |
| $Li_2O$ | — | — | — | — | 2.0 | — | — | — |
| $Bi_2O_3$ | — | — | — | — | — | — | 13.0 | — |
| Melting point (°C.) | 740 | 720 | 760 | 750 | 700 | 730 | 700 | 740 |
| Thermal expansion coefficient | $5.8 \times 10^{-6}$ | $5.9 \times 10^{-6}$ | $5.5 \times 10^{-6}$ | $5.7 \times 10^{-6}$ | $6.0 \times 10^{-6}$ | $5.8 \times 10^{-6}$ | $5.8 \times 10^{-6}$ | $6.1 \times 10^{-6}$ |
| Firing temperature (°C.) | 780 | 760 | 800 | 790 | 740 | 770 | 740 | 780 |
| External appearance after acid resistance and alkali resistance tests. | No change | No change | No change | No change | No change | No change | No change | No change |

EMBODIMENT 9

Instead of lanthanum oxide of the Embodiment 1, niobium oxide, tantalum oxide, hafnium oxide, scandium oxide, samarium oxide, europium oxide, gadolinium oxide, thulium oxide, ytterbium oxide, lutetium oxide, terbium oxide, or dysprosium oxide were added.

Table 2 summarizes the properties of the overglaze colors for pottery including melting point, thermal expansion coefficient, firing temperature, and the change of external appearance after acid resistance and alkali resistance tests.

As shown in Table 2, overglaze colors having the same performance characteristics as the overglaze colors in Embodiment 1 were obtained. When the pigments of Embodiment 1 were added, color developed in the same manner as in Embodiment 1.

The thermal softening temperature (°C.), Vickers hardness (kg/mm$^2$) and hue of each frit to be used for overglaze colors for pottery are shown in Table 3.

TABLE 2

| Added component (wt %) | Melting point (°C.) | Thermal expansion coefficient | Firing temperature (°C.) | External appearance* |
|---|---|---|---|---|
| Vanadium oxide | 740 | $5.8 \times 10^{-6}$ | 780 | No change |
| Niobium oxide | 750 | $5.7 \times 10^{-6}$ | 790 | No change |
| Tantalum oxide | 750 | $5.7 \times 10^{-6}$ | 790 | No change |
| Hafnium oxide | 740 | $5.8 \times 10^{-6}$ | 780 | No change |
| Scandium oxide | 750 | $5.8 \times 10^{-6}$ | 790 | No change |
| Yttrium oxide | 770 | $5.6 \times 10^{-6}$ | 810 | No change |
| Cerium oxide | 730 | $5.9 \times 10^{-6}$ | 770 | No change |
| Praseodymium oxide | 750 | $5.8 \times 10^{-6}$ | 790 | No change |
| Neodymium oxide | 740 | $5.7 \times 10^{-6}$ | 780 | No change |
| Samarium oxide | 750 | $5.7 \times 10^{-6}$ | 790 | No change |
| Europium oxide | 750 | $5.7 \times 10^{-6}$ | 790 | No change |

TABLE 2-continued

| Added component (wt %) | Melting point (°C.) | Thermal expansion coefficient | Firing temperature (°C.) | External appearance* |
|---|---|---|---|---|
| Gadolinium oxide | 750 | $5.6 \times 10^{-6}$ | 790 | No change |
| Holmium oxide | 740 | $5.6 \times 10^{-6}$ | 780 | No change |
| Erbium oxide | 750 | $5.8 \times 10^{-6}$ | 790 | No change |
| Thulium oxide | 760 | $5.7 \times 10^{-6}$ | 800 | No change |
| Ytterbium oxide | 760 | $5.7 \times 10^{-6}$ | 800 | No change |
| Lutetium oxide | 750 | $5.8 \times 10^{-6}$ | 790 | No change |
| Terbium oxide | 740 | $5.8 \times 10^{-6}$ | 780 | No change |
| Dysprosium oxide | 730 | $5.9 \times 10^{-6}$ | 770 | No change |

*External appearance after acid resistance and alkali resistance tests.

TABLE 3

| Added component | Thermal softening point (°C.) | Vickers hardness (kg/mm$^2$) | Hue |
|---|---|---|---|
| Lanthanum oxide (Embodiment 1) | 637 | 542 | No color |
| Niobium oxide | 622 | 517 | No color |
| Tantalum oxide | 612 | 530 | No color |
| Hafnium oxide | 623 | 523 | No color |
| Scandium oxide | 626 | 549 | No color |
| Samarium oxide | 622 | 526 | No color |
| Europium oxide | 633 | 540 | No color |
| Gadolinium oxide | 630 | 525 | No color |
| Thulium oxide | 630 | 519 | No color |
| Ytterbium oxide | 625 | 532 | No color |
| Lutetium oxide | 626 | 525 | No color |
| Terbium oxide | 626 | 534 | No color |
| Dysprosium oxide | 631 | 546 | No color |

EMBODIMENTS 9-23

The following mixtures were prepared and fired, and overglaze colors for pottery were prepared by the same procedure as in Embodiment 1.

| | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|
| SiO$_2$ | 55.00 | 53.00 | 51.00 | 45.00 | 45.00 | 45.00 | 45.00 | 45.00 |
| ZrO$_2$ | 3.00 | 3.00 | 4.00 | 4.00 | 4.00 | 4.00 | 4.00 | 4.00 |
| Al$_2$O$_3$ | 2.00 | 2.00 | 3.00 | 3.00 | 3.00 | 3.00 | 3.00 | 3.00 |
| B$_2$O$_3$ | 24.00 | 26.00 | 26.00 | 27.00 | 27.00 | 27.00 | 27.00 | 27.00 |
| Rare earth elements | 2.00 (La) | 2.00 (La) | 2.00 (La) | 5.00 (Dy) | 5.00 (Ta) | 5.00 (Nb) | 5.00 (Hf) | 5.00 (Sc) |
| BaO | 2.00 | 2.00 | 2.00 | 4.00 | 4.00 | 4.00 | 4.00 | 4.00 |
| ZnO | 2.00 | 2.00 | 2.00 | 3.00 | 3.00 | 3.00 | 3.00 | 3.00 |
| K$_2$O | 6.00 | 6.00 | 6.00 | 6.00 | 6.00 | 6.00 | 6.00 | 6.00 |
| Na$_2$O | 3.00 | 4.00 | 4.00 | 3.00 | 3.00 | 3.00 | 3.00 | 3.00 |
| Li$_2$O | 1.00 | — | — | — | — | — | — | — |
| Acid resistant test[1] | No abnormal sign | No abnormal sign | No abnormal sign | No abnormal sign | No abnormal sign | No abnormal sign | No abnormal sign | No abnormal sign |
| Thermal expansion coefficient[2] | $6.2 \times 10^{-6}$ | $6.3 \times 10^{-6}$ | $6.3 \times 10^{-6}$ | $6.5 \times 10^{-6}$ | $5.9 \times 10^{-6}$ | $6.4 \times 10^{-6}$ | $6.3 \times 10^{-6}$ | $6.1 \times 10^{-6}$ |
| Glass softening point[3] | 561 | 568 | 567 | 577 | 567 | 572 | 580 | 596 |
| Glass transition temp.[3] | 510 | 517 | 518 | 525 | 515 | 536 | 525 | 532 |

| | Embodiment 17 | Embodiment 18 | Embodiment 19 | Embodiment 20 | Embodiment 21 | Embodiment 22 | Embodiment 23 |
|---|---|---|---|---|---|---|---|
| SiO$_2$ | 45.00 | 45.00 | 45.00 | 45.00 | 45.00 | 45.00 | 45.00 |
| ZrO$_2$ | 4.00 | 4.00 | 4.00 | 4.00 | 4.00 | 4.00 | 4.00 |
| Al$_2$O$_3$ | 3.00 | 3.00 | 3.00 | 3.00 | 3.00 | 3.00 | 3.00 |
| B$_2$O$_3$ | 27.00 | 27.00 | 27.00 | 27.00 | 27.00 | 27.00 | 27.00 |
| Rare earth elements | 5.00 (Sm) | 5.00 (En) | 5.00 (Gd) | 5.00 (Tm) | 5.00 (Yb) | 5.00 (Lu) | 5.00 (Tb) |
| BaO | 4.00 | 4.00 | 4.00 | 4.00 | 4.00 | 4.00 | 4.00 |
| ZnO | 3.00 | 3.00 | 3.00 | 3.00 | 3.00 | 3.00 | 3.00 |
| K$_2$O | 6.00 | 6.00 | 6.00 | 6.00 | 6.00 | 6.00 | 6.00 |
| Na$_2$O | 3.00 | 3.00 | 3.00 | 3.00 | 3.00 | 3.00 | 3.00 |
| Li$_2$O | — | — | — | — | — | — | — |
| Acid resistant test[1] | No abnormal sign | No abnormal sign | No abnormal sign | No abnormal sign | No abnormal sign | No abnormal sign | No abnormal sign |
| Thermal expansion coefficient[2] | $6.6 \times 10^{-6}$ | $6.6 \times 10^{-6}$ | $6.3 \times 10^{-6}$ | $6.6 \times 10^{-6}$ | $6.1 \times 10^{-6}$ | $6.3 \times 10^{-6}$ | $6.5 \times 10^{-6}$ |
| Glass softening point[3] | 585 | 589 | 600 | 578 | 585 | 574 | 586 |
| Glass transition temp.[3] | 532 | 537 | 535 | 530 | 532 | 523 | 534 |

[1] Immersed in 4% acetic acid solution for one day.
[2] 50° C.-350° C.
[3] °C.

We claim:

1. As overglaze color composition for pottery comprising a colorless frit and a pigment, said frit consisting of the following composition in wt %:
   silicon dioxide 45.0 to 55,
   alumina 0.1 to 6,
   boron oxide 20 to 40,
   alkali metal oxide 2 to 17,
   an oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, and dysprosium oxide 0.1 to 5.0,
alkaline earth metal oxide 0 to 25,
zirconium oxide 0 to 15,
zinc oxide 0 to 15,
and having a thermal expansion coefficient of $5.0 \times 10^{-6}/°C.$ to $7.0 \times 10^{-6}/°C.$ at 50 to 350° C., a thermal softening temperature of 500° to 640° C., and characterized in that there is no visual external change when fired at 700° to 900° C. and immersed in a 4% acetic acid aqueous solution and a 3% caustic soda aqueous solution, respectively, for one day.

2. An overglaze color composition for pottery comprising a colorless frit and a pigment, said frit consisting of the following composition in wt %:
silicon dioxide 45.0 to 50,
alumina 0.1 to 6,
boron oxide 20 to 40,
alkali metal oxide 2 to 17,
an oxide selected from lanthanum oxide, niobium oxide, tantalum oxide, hafnium oxide, scandium oxide, samarium oxide, europium oxide, gadolinium oxide, thulium oxide, ytterbium oxide, lutetium oxide, terbium oxide, and dysprosium oxide 0.1 to 5.0,
alkaline earth metal oxide 0 to 25,
zirconium oxide 0 to 25,
zinc oxide 0 to 15,
an having a thermal expansion coefficient of $5.0 \times 10^{-6}/°C.$ to $7.0 \times 10^{-6}/°C.$ at 50° to 350° C., a thermal softening temperature of 500° to 640° C., and characterized in that there is no visual external change when fired at 700° to 900° C. and immersed in a 4% acetic acid aqueous solution and a 3% caustic soda aqueous solution, respectively, for one day.

* * * * *